United States Patent Office 3,842,055
Patented Oct. 15, 1974

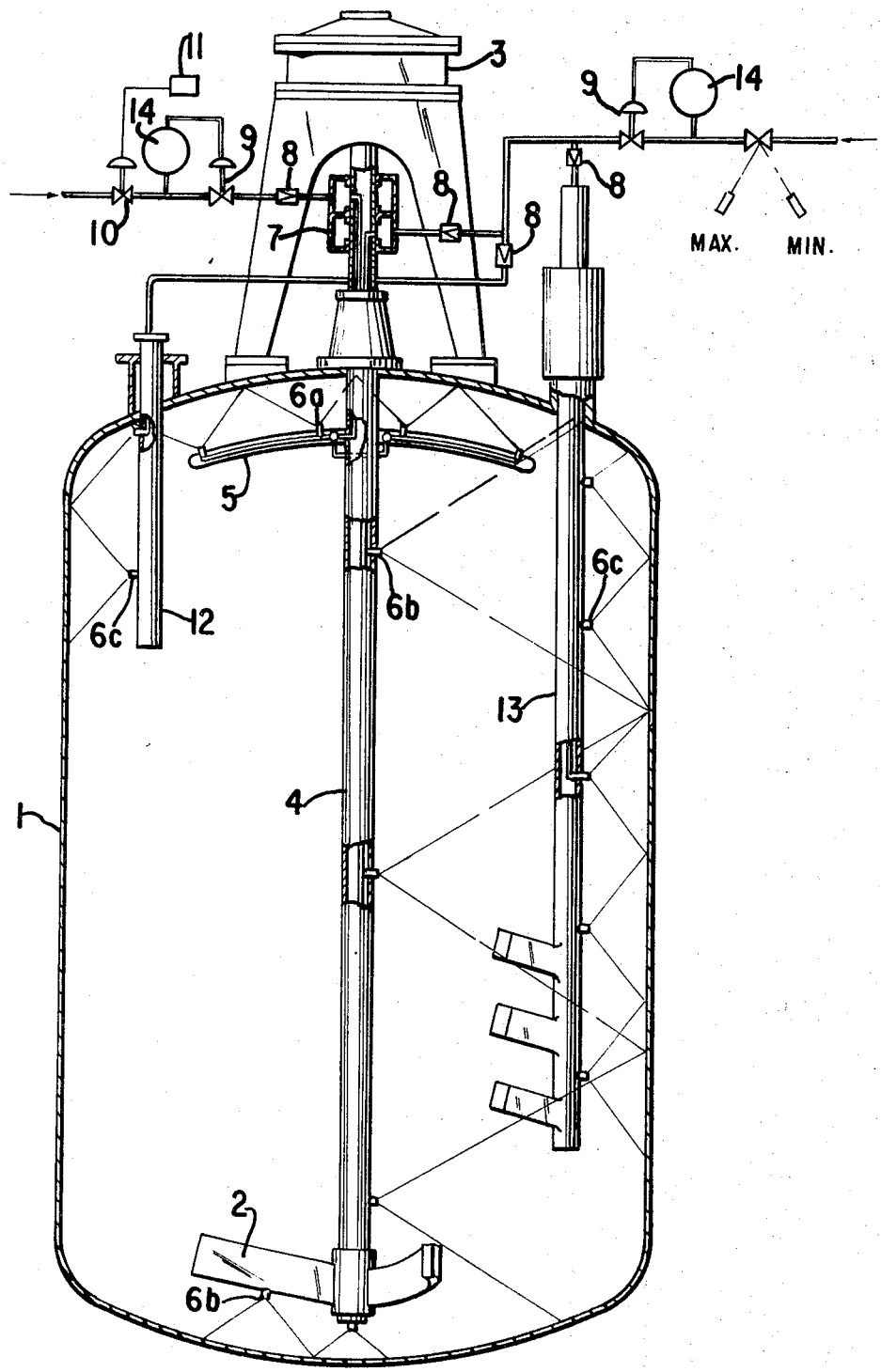

3,842,055
PROCESS FOR DISPERSION POLYMERIZATION OF VINYL CHLORIDE WITH LOW POLYMER DEPOSITION
Richard Gabriel, Thomas Balwe, Johann Bauer, Kurt Fendel, and Rupert Kaczerofsky, Burghausen, Germany, assignors to Wacker Chemie GmbH, Munich, Germany
Filed June 13, 1973, Ser. No. 369,497
Claims priority, application Germany, Aug. 14, 1972,
P 22 39 942.4
Int. Cl. C08f 1/11, 1/98
U.S. Cl. 260—87.1                                  7 Claims

ABSTRACT OF THE DISCLOSURE

An improvement in the free radical polymerization in an aqueous dispersion of a polymerizate containing at least 60% of polyvinyl chloride wtih low polymer deposits by the steps of mixing (1) monomers selected from the group consisting of vinyl chloride and mixtures of vinyl chloride with up to 40% by weight of olefinically mono-unsaturated compounds copolymerizable with vinyl chloride, (2) a free-radical forming polymerization catalyst, (3) dispersion stabilizers including protective colloids and/or emulsifiers, and (4) water, heating said mixture under agitation to polymerization temperatures and recovering said polymerizate, the improvement comprising conducting the polymerization in a confined space and spraying a fine spray of water in a total amount of from 20% to 100% by volume of the volume of said monomers, on to the exposed surfaces of said confined space for the entire period of said polymerization and during any distillation of unreacted monomers from the polymerizate dispersion, whereby a polymerizate is recovered with low polymer deposits.

The Prior Art

In the free-radical polymerization or copolymerization of vinyl chloride in an aqueous dispersion, the polymer settles on the wall of the reaction vessel, as well as on the fittings, such as the stirrer, current distrubers and thermometer tube, and in the feed pipe connections and valves at the head of the autoclave. These PVC-deposits cause a reduction of the heat transfer, a contamination of the product in the following charges and an impairment of safety by the clogging of the valve fittings at the top of the reaction vessel. It is, therefore, generally necessary to eliminate the product deposits in the vessel after each charge.

The cleaning is generally effected by scraping off the crusts with a spatula. To this end it is necessary to remove the remaining vinyl chloride gas from the polymerization vessel so that the operating crew can enter in. Furthermore a continuous analytical control of the vinyl chloride concentration in the autoclave is necessary during the presence of the cleaning crew. After the cleaning operations are completed, the autoclave is closed again and the air contained in the vessel must be completely removed by evacuation or by repeated flushing with nitrogen.

These complicated operations can be curtailed somewhat if the cleaning is not effected manually, but with high pressure water. The injection is effected by an operator with a spray gun or by a spraying apparatus which is introduced through the manhole, but only lightly adhering crusts and films can be removed this way.

In order to reduce the deposit of polymer crusts on the wall of the vessel and on the fittings, numerous additions to the polymerizate dispersion have been suggested, for example, catalysts, protective colloids or other aids. The effect of these additions on the parts of the autoclave walls and fittings wetted by the dispersion are limited. Practice has shown, however, that considerable deposits are found not only there, but also in the top of the vessel. These are formed, on the one hand, by condensation and subsequent polymerization of gaseous vinyl chloride at the top of the vessel, and on the other hand, by the foaming up of the polymer mixture during the polymerization, particularly after the polymerization, when the unreacted monomer is removed by distillation. If the fittings of the vessel and the respective valves are clogged and unusable, this greatly jeopardizes the safety of the polymerization operation. In practice it has not been possible heretofore to effect several polymerization charges in succession without opening the autoclave in between.

Furthermore a polymer crust is formed above the liquid level by the liquid volume contraction which occurs during the polymerization. This deposit cannot be prevented by additives.

Objects of the Invention

An object of the present invention is the development of improved processes for the aqueous dispersion, free-radical polymerization of vinyl chlorides where the polymer deposits are substantially eliminated thus enabling repeated polymerizations in the reactor without necessity for its cleaning after each polymerization.

Another object of the present invention is the development, in the free-radical polymerization process for the production of polymerizates in an aqueous dispersion containing at least 60% of polyvinyl chloride, with low polymer deposits, which comprises the steps of mixing (1) monomers selected from the group consisting of vinyl chloride and mixtures of vinyl chloride with up to 40% by weight of olefinically mono-unsaturated compounds copolymerizable with vinyl chloride, (2) a free-radical-forming polymerization catalyst, (3) dispersion stabilizers including protective colloids and/or emulsifiers, and (4) water, heating said mixture under agitation to a polymerization temperature of between 0° C. and 80° C., and recovering said polymerizate, of the improvement which consists in conducting said polymerization in a confined space and spraying a fine spray of water in a total amount of from 20% to 100% by volume of the volume of said monomers, onto the exposed surfaces of said confined space during the period of said polymerization and during any distillation of unreacted monomers from the polymerizate dispersion, whereby a polymerizate is recovered with low polymer deposits.

These and other objects of the invention will become more apparent as the description thereof proceeds.

Description of the Drawing

The figure is a cross-section on several planes of an autoclave equipped to practice the invention.

Description of the Invention

This invention solves the problem of reducing the deposits of polymers which occur on the surfaces which are not wet by the dispersion during the dispersion polymerization of vinyl chloride, if necessary, together with a comonomer, in conventional factory autoclaves.

A method has now been found for the polymerization of vinyl chloride or for the copolymerization of vinyl chloride with up to 40% by weight of additional mono-olefinically-unsaturated monomers in aqueous dispersion in the presence of free-radical-formers, protective colloids and/or emulsifiers in an autoclave with necessary fittings, which prevents polymerization deposits to a great extent. The method is characterized in that water in amounts of 20% to 100% by volume, preferably 30% to 80% by volume, of the monomer is sprayed on the autoclave dome, on the wall parts of the autoclave walls not covered by the dispersion, and on the fittings, if any, during the polymerization and during the distillation of the unreacted monomer following the polymerization.

More particularly, the invention relates to an improvement in the free radical polymerization process for the production of polymerizates in an aqueous dispersion containing at least 60% of polyvinyl chloride, with low polymer deposits, which comprises the steps of mixing (1) monomers selected from the group consisting of vinyl chloride and mixtures of vinyl chloride with up to 40% by weight of olefinically mono-unsaturated compounds copolymerizable with vinyl chloride, (2) a free-radical-forming polymerization catalyst, (3) dispersion stabilizers including protective colloids and/or emulsifiers, and (4) water, heating said mixture under agitation to a polymerization temperature of between 0° C. and 80° C., and recovering said polymerizate, the improvement which consists in conducting said polymerization in a confined space and spraying a fine spray of water in a total amount of from 20% to 100%, preferably 30% to 80%, by volume of the volume of said monomers, onto the exposed surfaces of said confined space during the period of said polymerization and during any distillation of unreacted monomers from the polymerizate dispersion, whereby a polymerizate is recovered with low polymer deposits.

Due to the measure according to the invention it is possible to effect several charges in succession without cleaning the autoclave. The cycle times are thus substantially reduced. The effect of the claimed measure is so good that the autoclave can remain closed for several polymerization cycles without undergoing any risk (without checking whether the valves and fittings in the autoclave head are clogged), since there are practically no wall deposits formed in the gas phase.

Furthermore, the volume contraction of the aqueous dispersion, which is caused by the polymerization of vinyl chloride to PVC, is at least compensated by the water spraying. Consequently, no polymer crust is formed at the edge between the gas and liquid phase. Contamination of the PVC obtained by fragments from parts of this crust, which leads to fisheyes, is thus prevented.

In order to be able to effect the spraying during the polymerization and during the subsequent distillation, a corresponding device must be installed in the top of the autoclave which permits spraying from orifices or nozzles. An expedient spraying device is, for example, a ring conduit in the top of the autoclave, which has several openings (nozzles or orifices). The ring conduit is supplied with water by means of a pump. The openings are so arranged that the autoclave dome, the valves, fittings and, if necessary, all parts of the fittings and walls which project from the dispersion, can be sprayed.

The amount of water injected is from 20% to 100% by volume, based on the amount of monomer, and preferably 30% to 80% by volume. The water can be injected in equal amounts continuously during the entire polymerization and distillation. But it is also possible to effect the injection of the water intermittently so that the water is only injected during short periods of 0.5 to 5 minutes, for example, while during the interval of 0.5 to 60 minutes, no water or only a reduced amount of water is injected. The advantage of the intermittent injection is that during the time of the injection a high velocity (which can be achieved, for example, by applying a higher pressure), the cleaning effect on the vessel surface is correspondingly greater, so that smaller amounts of water are sufficient. The advantage of continuous dosage is that the vessel temperature is not influenced and that practically no deposit is formed by the continuous spraying (a greater cleaning effect is thus not necessary). Cold water as well as hot water can be injected.

Furthermore the water can contain important auxilary substances for the continuation of the polymerization, for example, catalysts, protective colloids or emulsifiers. Of particular advantage, however, is the addition of water containing defoamers, particularly during the distillation of the unreacted monomers (for its foam-inhibiting effect). For example, defoamers based on silicones can be used with good advantage.

In order to carry out the method of the invention, it is of advantage to use an autoclave where one or several rotatable arms provided with spray nozzles and water connections are arranged in the top of the autoclave. From these rotating arms, the autoclave dome and the autoclave walls as well as the fittings can be thoroughly sprayed. Besides, fewer nozzles are required, since each individual nozzle can cover a larger area by the rotation. The rotating arms are driven by means of a tubular shaft in which is also arranged the water supply.

Another expedient design consists in that the autoclave is equipped with a stirrer on which are arranged arms with nozzles, and that the supply line for the water is arranged in the stirrer shaft. This arrangement has the result that the rotation of the stirrer—stirrer with top drive—can also be utilized for the rotation of the water spray arms. Furthermore, it is possible to use a central line secured in the autoclave on which are arranged rotatable nozzles which are turned by the reaction effect of the issuing water.

All these devices are mostly operated intermittently, short periods of high admission alternating with long periods of low admission. Due to this method it is possible to work with small amounts of water.

Furthermore, nozzles can also be arranged in the stirrer or in other fixed fittings, such as thermometer tube and flow disturbers. These are connected to a separate water-pressure system. During the polymerization only small amounts of water issue from the nozzle. After the polymerization is completed and the polymerizate containing water has been discharged, the autoclave is flushed out by spraying with high pressure water. This measure permits cleaning of the autoclave without opening the autoclave and entering it.

The polymerization of vinyl chloride can be effected both in emulsion and in suspension. With emulsion polymerization, water-soluble, free-radical-forming catalysts are used, such as hydrogen peroxide, persulfates and redox systems. In suspension polymerization, oil-soluble catalysts are used, such a dialkylperoxides, diacylperoxide, peresters, dialkylperoxydicarbonates and acetylcyclohexylsulfonyl peroxide or mixtures thereof.

Preferably, dialkylperoxydicarbonates are used whose alkyl radicals contain 16 to 18 carbon atoms, if necessary, together with small amounts of water-soluble nitrites, such as alkali metal nitrites (0.0001% to 0.01% by weight, based on the monomers), since this can prevent to a great extent deposits on the walls covered by the suspension. The use of the measures to prevent wall deposits in the dispersion is also possible in combination with the water spraying according to the invention.

The polymerization is carried out according to the known methods of polymerization at temperatures of between 0° C. and 80° C., preferably from 30° C. to 80° C., and pressures frequently between 1 and 15 atmospheres. Mostly the polymerization is effected at the autogenous pressure of the monomers.

Mainly cooled autoclaves are used having cooled or jacketed shells and, possibly, also cooled or jacketed covers. These autoclaves usually are supplied with stirring devices, baffle plates and flow disturbers and are optionally equipped with any required dosing devices. The attachment of a reflux condenser is also possible.

The emulsifiers when employed are, for example, fatty acid soaps, alkyl sulfates, alkane sulfonates, alkylaryl sulfonates, sulfosuccinic acid esters of higher alkanols, alkyl ammonium salts, condensation products of lower alkylene oxides, such as ethylene oxide or propylene oxide with fatty acids of fatty alcohols and/or the protective colloids, when employed, are, for example, cellulose ethers, polyvinyl alcohol, if necessary with up to 40% acetyl groups, as well as copolymers of maleic acid or its half ester, with styrene. These materials are utilized in the usual amounts.

Furthermore it is possible within the framework of the claimed method to use the additives generally employed in the polymerization of vinyl chloride, such as particle size regulators, for example, inorganic salts, such as sodium chloride or calcium chloride; buffer salts, such as sodium bicarbonate, sodium carbonate, calcium carbonate, alkali metal phosphates, such as secondary potassium phosphate; molecular weight regulators, such as aliphatic aldehydes or alkanals, chlorinated hydrocarbons, such as di- and tri-chloroethylene, chloroform, mercaptans, propylene, isobutylene and cyclohexene. The pH value of the aqueous phase is mostly maintained at 3 to 8, preferably 3.5 to 7. Furthermore, the polymerization can be effected under an inert gas pressure, for example, with nitrogen. This frequently prevents foaming of the dispersion, particularly during the heating of the reaction vessel.

At the start of the polymerization, mostly very little water is charged, but at least a volume ratio of monomer to water of 50:50 is charged. It is of advantage that the heating-up period is short, because of the small amount of water, and that the necessary energy for heating can be kept low. In the course of time, the amount of water increases by the injection so that there is always an easily stirrable dispersion present. Altogether more vinyl chloride per unit of autoclave volume can be polymerized by the addition of water during the polymerization (up to about 10% by weight), since the loss of volume of polymerizate dispersion caused by the volume contraction can be fully utilized.

It is also of advantage that the autoclave is less filled during the heating period than in conventional polymerization methods and a larger volume filled with gas is available for breaking the foam.

The claimed method is also suitable for the copolymerization of vinyl chloride with other mono-olefinically unsaturated monomers, mostly utilized in amounts up to 40% by weight, preferably up to 30% by weight. Examples of olefinically mono-unsaturated compounds copolymerizable with vinyl chloride which can be used as comonomers are particularly: vinyl esters of alkanoic acids with 2 to 20 carbon atoms, preferably vinyl acetate. Other vinyl esters which can be used are: vinyl propionate, vinyl butyrate, vinyl 2-ethyl-hexanoate, vinyl laurate, vinyl esters of α-branched alkanoic acids having 8 to 24 carbon atoms, such as "Versatic acids," vinyl esters of isotridecanoic acid (an isomer mixture of highly branched compounds, which contains primarily tetramethyl nonanoic acid); vinyl halides, for example, vinyl fluoride, vinylidene fluoride, vinylidene chloride; unsaturated carboxylic acids and their mono- or diesters with alkanols with 1 to 18 carbon atoms, such as acrylic acid, methacrylic acid, fumaric acid, maleic acid, and itaconic acids, such as 2-methylhexyl, acrylate, methyl methacrylate, maleic acid di- or mono-2-ethylhexyl ester, dioctyl fumarate; vinyl ethers; olefins, such as ethylene, propylene, butylene, 2-methylpentene-1; styrene; allyl compounds and acrylonitrile. Mixtures of the monomers can also be used. Both the comonomers and the vinyl chloride can be added during the polymerization. When ethylene and propylene are used, up to 100 atmospheres are necessary in some cases.

The polymerizates produced can be utilized in all forms of utilizations previously employed for dispersion polymerized vinyl chloride.

The measures according to the invention have the effect that, through the wall deposits being prevented or reduced by the corresponding additions of water to the dispersion, the autoclave need not be opened for several charges, for example, 10 times in succession, without undergoing any risk of safety. The substances required for the polymerization are pumped into the closed autoclave after the preceding charge has been discharged. The claimed method can be used both for batch polymerization or for continuous polymerization.

Description of the Drawing

The drawing shows a special arrangement with which the claimed method can be carried out.

In a stirring vessel 1 is arranged a stirrer 2, which is driven by a drive 3. On the stirrer shaft 4 are secured one or several arms 5 which are provided with nozzles 6a and which rotate with the stirrer. The supply of the cleaning medium is effected with overpressure from the outside through a stuffing box 7. A non-return valve 8 and a quick-action valve 9 controlled by a pressure controller 14 prevent the contents of the vessel from flowing to the outside when the pressure drops in the supply line. A throttle valve 10 with adjustable automatic cycle operation 11 ensures that the full amount of the medium is supplied only for a short time, followed by a longer period during which only so much medium is supplied that clogging of the nozzles by polymerization is prevented. This cycle repeats itself during the entire reaction time. A second supply line, secured and equipped in the same manner as described above, leads to nozzles 6b, which are arranged on the stirrer shaft 4 or on the stirrer blades 2. They are operated with throttled supply during the entire reaction time and enter into action briefly and with full admission only after the vessel has been emptied.

Finally, there are similar systems, if necessary, in the fittings, like the thermometer tube 12, current disturbers 13, etc., whose nozzles 6c cover those parts of the inner wall which are arranged in the spray shadow of the stirrer shaft nozzles. They are actuated in the same manner as the nozzles 6b.

The following examples are illustrative of the invention without being limitative in any manner.

EXAMPLE 1

Comparison Example

The following polymerization recipe is charged into a 25 m.³ VA-steel autoclave:

13,400 kg. of deionized water
1.2 kg. of sodium bicarbonate
4.8 kg. of polyvinyl alcohol with about 40% residual acetate groups
1.0 kg. of methyl cellulose
4.2 kg. of dicetylperoxy dicarbonate (85%)
8,200 kg. of vinyl chloride.

The autoclave was heated to 54° C. and the charge was polymerized at this temperature within 11 hours to a monomer conversion of about 85%. The remaining monomer was then distilled off. Subsequently, the manhole cover of the autoclave was opened, the suspension discharged and the autoclave was rinsed with tap water under 2 to 3 atmospheres. On entering the vessel, it was found that the valve sockets which lead into the autoclave cover were partly clogged by polymer crusts. Polymer crusts were also found in the gas area (defined as the area which is not covered by the liquid phase after the polymerization is completed) on the walls, on the stirrer, splashboard and thermometer socket. These polymer crusts could not be removed with regular tap water.

This polymerization charge was repeated twice and the autoclave was entered after each charge to clean the valve sockets.

After a total of three charges, polymer crusts peeled off the gas area of the autoclave in the form of skins from the autoclave wall. The product quality as well as the regulation of the reaction were thus impaired. Though the PVC obtained after the first charge showed only about 5 fisheyes per 100 cm.² after a rolling time of 10 minutes in the speck test (1), the product of the third charge had about 30 fisheyes per 100 cm.² of plastic film. Proper regulation of the autoclave in the third charge was no longer possible, because detached polymer films had placed themselves around the thermometer gauge and considerably impaired the heat transfer to the gauge.

The autoclave was cleaned by hand after the third charge and 4.5 kg. of polymer fragments and films were removed from the gas area as well as from the stirrer, splashboard and thermometer gauge. 500 gm. of polymerizate could also be scraped off from the vessel wall in the liquid phase (defined as the part of the autoclave which is still wetted by the suspension after the polymerization is completed).

(1) Execution of the Speck Test.—100 gm. of the PVC to be tested are mixed with 55 gm. of di-iso-octyl phthalate, 1 gm. of wax L and 0.25 gm. of carbon black and subsequently rolled at 140° C. on a set of rollers to a film of 0.2 mm. thickness. After a rolling time of 10 minutes, a piece of about 100 cm.$^2$ is cut out from the film and the number of fisheyes are counted on a light frame.

EXAMPLE 2

The autoclave described in Example 1 was equipped with a ring conduit which was installed directly under the dome of the autoclave. The conduit, which had a diameter of about 1.5 cm., was provided in the upper half with holes of about 1 mm. in intervals of about ½ m., which were so arranged that one jet during the water passage was directed downward and another one towards the autoclave dome. A polymerization charge according to Example 1 was polymerized, while water was injected during the polymerization through the ring conduit by means of a pump.

The pumping was effected intermittently, that is, 145 liters of water were injected every half hour during the reaction over a period of a few minutes, until a total amount of 3200 liters of water had been injected by the end of the polymerization. This amount of injected water corresponded approximately to the volume contraction which incurred in the polymerization of 8200 kg. of vinyl chloride to PVC with an 85% conversion.

The amount of water thus compensated the volume contraction, so that the filling of the autoclave at the end of the reaction corresponded approximately to that at the start of the polymerization.

The autoclave was not opened after the first charge. During the distillation of the residual monomer, water was again pumped into the ring conduit. This was also done for re-rinsing during the discharge of the suspension.

For the next charge all components of the formula were pumped in. The dicetylperoxy dicarbonate was dissolved for this purpose in toluene. It was found that the water used, contrary to previous experience, did not have to be liberated of atmospheric oxygen by evacuation.

After three charges of this type, the manhole cover was opened and the incrustation in the gas area and in the valve sockets was checked. It was found that the valve sockets as well as the entire wall of the gas chamber were free of polymer. Then three more charges were again polymerized without intermediate cleaning and without opening the cover.

When the autoclave was opened after these three additional charges, it was found that all valve sockets without exception were free of polymer, likewise the wall of the gas area. About 1 kg. of polymer fragments had to be removed from the part of the stirrer, splashboard and thermometer gauge in the gas phase and from the wall in the liquid phase about 300 gm. of polymerizate could be scraped off.

The regulation of the reaction temperature was completely normal in all six charges, the product of the 6th charge showed, in the speck test, five fisheyes per 100 cm.$^2$ of plastic film.

EXAMPLE 3

Corresponding to Example 2, six charges were polymerized without intermediate cleaning of the autoclave and without opening the manhole cover. As a technical variant spray nozzles (diameter of the nozzles about 0.1 mm.) were installed at the points which had been pierced in the ring conduit used in Example 2. The total amount of 4600 liters of water was introduced continuously through these nozzles during the entire reaction time as well as during the distillation of the residual monomer and during the discharge of the suspension.

After six charges the valve sockets were free of polymer. In the gas area the autoclave wall was completely bright. Only about 200 gm. of polymer could be removed from the stirrer, splashboard and thermometer gauge. From the wall in the liquid phase, about 350 gm. of polymer could be scraped off. The product of the 6th charge showed three fisheyes per 100 cm.$^2$ of plastic film in the speck test.

EXAMPLE 4

The following polymerization recipe was charged into a 12 m.$^3$ VA-steel autoclave:

6,200 kg. of deionized water
2 kg. of calcium carbonate
10.6 kg. of polyvinyl alcohol
4 kg. of dilauroyl peroxide
0.5 kg. of dicetylperoxy dicarbonate (85%)
40 kg. of trichloroethylene
620 kg. of vinyl acetate
3,480 kg. of vinyl chloride.

The autoclave was heated to 64° C. and the charge was polymerized at this temperature within ten hours to a monomer conversion of about 92%. The residual monomer was distilled off. Subsequently, the suspension was discharged and the autoclave flushed with tap water at 2 to 3 atmospheres. After a total of three charges it was necessary to clean the autoclave by hand. Proper regulation was no longer possible in the third charge because the heat transfer was considerably impaired by polymer deposits on the wall of the thermometer gauge. The hand cleaning of the autoclave after the third charge yielded 16.0 kg. of polymer fragments and films from the gas area as well on the stirrer, splashboard and thermometer gauge. 9.2 kg. of polymer could be scraped off from the vessel wall in the liquid phase.

EXAMPLE 5

The polymerization was carried out as in Example 4, with the difference that the autoclave was equipped, as in Example 3, with a ring conduit which was provided with spray nozzles (diameter of the nozzles: about 0.3 mm.). Through this conduit were pumped 1800 liters of fully deionized water during the polymerization and the subsequent distillation.

After six successive polymerizations, according to Example 3, the autoclave was opened by hand. 8.4 kg. of polymer fragments and film were removed from the gas area as well as from the stirrer, splashboard and thermometer. 14.8 kg. of polymer could be scraped off from the vessel wall in the liquid phase.

The preceding specific embodiments are illustrative of the practice of the invention. It is to be understood, however, that other expedients known to those skilled in the art or disclosed herein may be employed without departing from the spirit of the invention or the scope of the appended claims.

We claim:
1. In the free-radical polymerization process for the production of polymerizates in an aqueous dispersion containing at least 60% of polyvinyl chloride, with low polymer deposits, which comprises the steps of mixing (1) monomers selected from the group consisting of vinyl chloride and mixtures of vinyl chloride with up to 40% by weight of olefinically mono-unsaturated compounds copolymerizable with vinyl chloride, (2) a free-radical-forming polymerization catalyst, (3) dispersion stabilizers selected from the group consisting of protective colloids, emulsifiers and mixtures thereof, and (4) water, heating said mixture under agitation to a polymerization temperature of between 0° C. and 80° C. and recovering said polymerizate, the improvement which consists in conducting said polymerization in a confined space and spraying a fine spray of water in a total amount of from 20% to 100% by volume of the volume of said monomers, onto the exposed surfaces of said confined space during the period of said polymerization and during any distillation of unreacted monomers from the polymerizate dispersion, whereby a polymerizate is recovered with low polymer deposits.

2. The process of claim 1 wherein the amount of water sprayed onto said exposed surfaces is from 30% to 80% by volume of the volume of said monomers.

3. The process of claim 1 wherein said spraying of water is effected intermittently.

4. The process of claim 1 wherein said spraying of water is effected constantly.

5. The process of claim 1 wherein said sprayed on water contains a defoamer.

6. The process of claim 1 wherein said free-radical-forming polymerization catalyst is a dialkylperoxy dicarbonate having 16 to 18 carbon atoms in the alkyl and said polymerization is effected in the presence of a water-soluble salt of nitrous acid.

7. The process of claim 6 wherein said dialkylperoxy dicarbonate is unbranched and employed in an amount of from 0.001% to 1% by weight, based on the monomers and said salt of nitrous acid is employed in an amount of from 0.0001% to 0.01% by weight, based on the monomers.

References Cited
UNITED STATES PATENTS 3,778,423  12/1973  Reiter _____ 260—92.8 W STANFORD M. LEVIN, Primary Examiner U.S. Cl. X.R.

260—28.5 D, 78.5 R, 78.5 CL, 85.5 XA, 87.5 B, 87.5 C, 87.5 R, 92.8 W; 23—290